United States Patent [19]
Carlson et al.

[11] 3,752,570
[45] Aug. 14, 1973

[54] FILM FOOTAGE INDICATOR

[75] Inventors: Richard K. Carlson, Tokyo, Japan; Henry J. Koeber, Deerfield, Ill.

[73] Assignee: Bell & Howell Company, Chicago, Ill.

[22] Filed: Sept. 3, 1971

[21] Appl. No.: 177,731

Related U.S. Application Data
[63] Continuation of Ser. No. 854,479, Sept. 2, 1969, Pat. No. 3,650,611.

[52] U.S. Cl. ............................. 352/172, 116/114 J
[51] Int. Cl. ............................................. G03b 1/60
[58] Field of Search........................ 352/72, 73, 170, 352/171, 172; 116/114 J

[56] References Cited
UNITED STATES PATENTS

| | | | |
|---|---|---|---|
| 3,601,479 | 8/1971 | Saitama-Ken...................... | 352/172 |
| 3,536,387 | 10/1970 | Winkler et al...................... | 352/72 |
| 1,812,068 | 6/1931 | Victor.................................. | 352/172 |
| 2,959,091 | 11/1960 | Richartz........................... | 352/172 X |

FOREIGN PATENTS OR APPLICATIONS

| | | | |
|---|---|---|---|
| 1,230,668 | 12/1966 | Germany......................... | 116/114 J |

Primary Examiner—Samuel S. Matthews
Assistant Examiner—Alan Mathews
Attorney—William F. Pinsak, John E. Peele, Jr. et al.

[57] ABSTRACT

A film footage indicator for movie cameras including a power source operable to drive a driving worm gear when the film is being advanced, a driven worm gear having a single row of teeth helically offset on the periphery thereof which are engageable with and driven by the driving worm gear, a pinion gear rigidly mounted on a shaft which is coaxial with but rotatable relative to the driving worm gear and in mesh with and rotated by the driven worm gear teeth, an indicator worm gear rotatable by the pinion gear, a spring indicator flexibly operably to engage the indicator worm gear by inserting a film cartridge into the camera and flexibly operable to be advanced by the rotating indicator worm gear and a marked window in the camera housing located in alignment with the advancement of the spring indicator for indicating the amount of exposed film. Upon removal of the cartridge from the camera, the spring element indicator will automatically disengage from the indicator worm gear and return to the initial (start) position.

3 Claims, 4 Drawing Figures

PATENTED AUG 14 1973
3,752,570
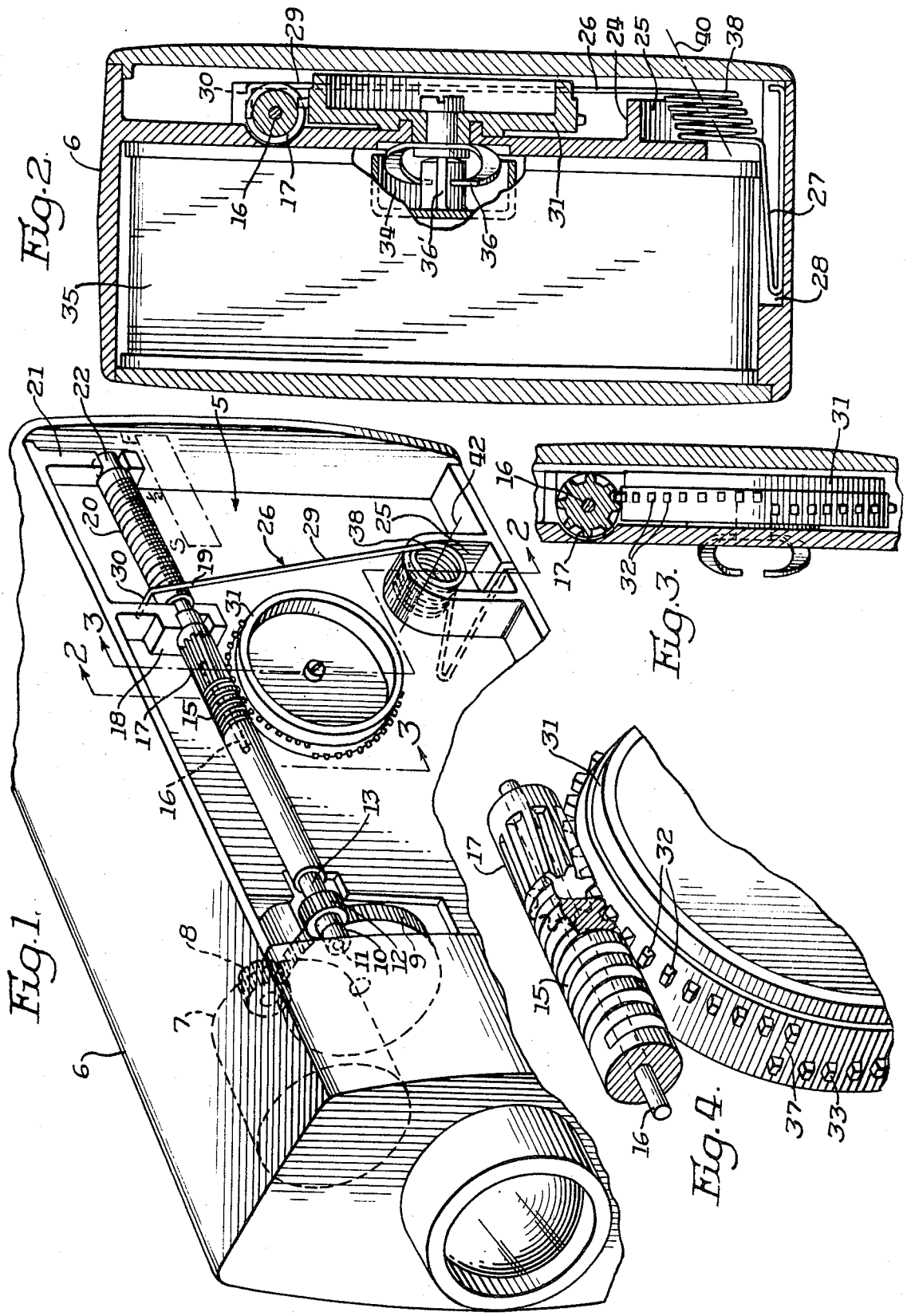

FILM FOOTAGE INDICATOR

This is a continuing application of Ser. No. 854,479, filed Sept. 2, 1969, now U.S. Pat. No. 3,650,611, entitled Film Footage Indicator.

This invention relates to film footage indicators for movie cameras and the like using film cartridges of conventional construction.

Conventional film footage indicators are dials which are rotated by complex gear trains. Other known indicators are slides operated by complex mechanisms. The manufacturing cost of the components and of the assembly for these components is undesirably high.

It is an object of this invention to provide film footage indicator means for denoting the relative, or proportional, measurement of film consumed or exposed, as well as that remaining for exposure.

It is another object of this invention to provide a spring indicator flexibly operable to engage an indicator worm gear in response to insertion of a film cartridge into the camera and flexibly operable to be indexed by the indicator worm gear in response to rotation thereof.

It is another object of this invention to provide a spring indicator flexibly operable to automatically disengage from the indicator worm gear and return to the initial S (start) position when the film cartridge is removed from the camera.

It is a further object of this invention to provide an indicator worm gear driving means including the driven worm gear engageable with the driving worm gear for rotation thereby and engageable with a pinion gear for advancing the pinion gear one tooth travel for a full revolution of the driven worm gear.

It is another object of this invention to provide a film footage indicator which can be produced economically in quantity production and which is simple, practical and efficient.

Further and other objects will be apparent from the description of the accompanying drawings, in which like numerals relate to like parts.

In the drawings:

FIG. 1 is a perspective view illustrating the film footage indicator mechanism assembly incorporated in a camera;

FIG. 2 is a transverse cross-sectional view taken, substantially, on the line 2—2 of FIG. 1;

FIG. 3 is a fragmentary and enlarged view depicting the helically offset toothed structure of the worm gear engaging the pinion gear for rotating the same; and FIG. 4 is a perspective view of the driving worm gear partially sectioned and in mesh with the driven worm gear and of the helically offset toothed portion of the driven worm gear in mesh with the pinion gear which is driven thereby.

Referring to the various figures, the invention is generally designated 5 and shows a camera 6 in which is mounted a power source 7 provided with a driving pinion 8 in meshing engagement with a spur gear 9 which in turn meshes a driven pinion 12 mounted on trunnion 10 rotating in bearing 11. Reduced portion 13 on shaft 14 serves to provide a driving worm gear 15.

A driven pinion gear 17 rotatably mounted in bearing 18 has a reduced portion 19 from which emanates the indicator worm gear 20 having a trunnion 22 mounted in bearing 21. Shaft 19 is connected to operate independently with reference to driving worm gear 15 by means of connecting axle 16.

A window 23 with marking S (start), F (finish) and the demarcation of one-half in order to approximately show the film footage record, namely as exposed as well as unexposed portions of film. Driving worm gear 15 drives driven worm gear 31 which is provided with toothed portion 32–33 offset peripherally and helically as shown at 37, a distance equal to the pitch of the teeth of the pinion gear 17. Hence, when worm gear 31 is rotated one complete revolution, it will rotate pinion gear 17 the distance of one tooth so that indicator worm gear 20 is rotated very slowly.

As best shown in FIG. 2, the important structural element of the invention is the spring indicator 26 housed in an elongated arched housing portion as shown at 24, defining a cavity 25. One end of spring 26 is bent, as shown, to form a knee 27 which is acutated by a film cartridge 35, it being seated in a slot 28. The conventional cartridge is equipped with a cavity 34 which exposes a driven clutch portion 36' engageable by a mating clutch member 36 secured to driven worm gear 31.

Referring to FIG. 1, looking through window 23, an upward extending pointer portion 29 of the spring 26 can be seen. Spring 26 terminates in a finger portion 30 formed at substantially right angles to said pointer 29 and adapted to fit and ride in the root of indicator worm gear 20.

When a film cartridge 35 is inserted in the camera compartment provided therefor, clutching member 36 engages its mating component 36' on the cartridge 35 causing the film exposed to be wound up on reels (not shown) therein when the main manipulating control (not shown) is actuated. Simultaneously, the cartridge 35 causes spring knee portion 27 to be depressed moving spring 26 downwardly to the position shown (see FIG. 2). Depressing spring 26 in this manner pulls finger portion 30 downward and displaces the axis 40 of the spring coils 38 at an angle relative to the normal axis 42 (FIG. 1) which substantially causes the pointer portion 29 to swing into engagement with and causes the finger portion 30 to bottom into engagement with the root of indicator worm gear 20 at the S (start) end of window 23.

Acutation of the power source 7 transmitted by driven worm gear 31 rotates indicator worm gear 20 at a predetermined rate which torsionally advances the indicator portion 29 past the window 23 thereby indicating the amount of film exposed.

When the film cartridge 35 is removed from the camera, the knee portion 27 of spring 26 is released and the spring 26 moves upward and the coil axis returns to normal, as shown in FIG. 2, which causes finger portion 30 to raise out of engagement from, and causes indicator portion 29 to swing out of engagement from, the indicator worm gear 20. The torsional effect of indicator portion 29 of spring 26 automatically returns to the initial position when disengaged from indicator worm gear 20.

What is claimed is:
1. A camera comprising:
a film supply;
drive means for moving film from said film supply;
indicia means in the camera;
a resilient indicating member being movable into operative engagement with said drive means responsive to inserting said film supply in said camera, said indicating member being flexurally movable relative to said indicia means in a first direction by said drive means for indicating the status of said flim supply, said member being flexurally movable in an opposite direction upon disengagement from said drive means responsive to removing said flim supply from said camera.

2. A camera as defined in claim 1 wherein said resilient indicator member is operable, when disengaged from said drive means, to return to an initial position by its internal tension.

3. In a motion picture camera having a film supply film footage counter comprising:
   indicia located on said camera;
   an indicator movable relative to said indicia for indicating the status of said film supply;
   a rotatable shaft formed for a first portion of its length as an indicator driving worm gear for engaging and advancing said indicator a predetermined linear increment with each rotational increment of said worm gear, said rotatable shaft being formed for a second portion of its length as a pinion gear having a plurality of generally axially extending teeth;
   a helical gear rotatable about an axis oriented in a direction at 90° relative to the direction of orientation of said rotatable shaft and having a single helically toothed portion having a helix pitch equal to the rotational distance between teeth in said pinion gear, said helically toothed portion engaging said pinion gear to rotate said pinion gear the rotational distance of one tooth with each revolution of said helical gear; and
   a driving means engaging said toothed portion of said helical gear for rotating said helical gear.

* * * * *